United States Patent [19]
Schepps

[11] Patent Number: 6,040,774
[45] Date of Patent: Mar. 21, 2000

[54] LOCATING SYSTEM AND METHOD EMPLOYING RADIO FREQUENCY TAGS

[75] Inventor: Jonathan Lloyd Schepps, Princeton, N.J.

[73] Assignee: Sarnoff Corporation, Princeton, N.J.

[21] Appl. No.: 09/085,410

[22] Filed: May 27, 1998

[51] Int. Cl.[7] .................................................. G08B 13/14
[52] U.S. Cl. ................ 340/572.1; 340/904; 340/825.36; 340/825.49; 340/825.69
[58] Field of Search .............................. 340/572.1, 568.1, 340/571, 904, 825.54, 825.08, 825.06, 825.36, 825.49, 825.69; 342/463, 465, 457, 387, 450

[56] References Cited

U.S. PATENT DOCUMENTS

| | | |
|---|---|---|
| 3,568,161 | 3/1971 | Knickel . |
| 4,334,221 | 6/1982 | Rosenhagen et al. . |
| 4,352,098 | 9/1982 | Stephen et al. .......................... 340/572 |
| 4,818,998 | 4/1989 | Apsel et al. . |
| 4,885,571 | 12/1989 | Pauley et al. . |
| 4,998,095 | 3/1991 | Shields . |
| 5,049,875 | 9/1991 | DeLuca et al. . |
| 5,119,104 | 6/1992 | Heller ...................................... 342/465 |
| 5,204,670 | 4/1993 | Stinton . |
| 5,298,884 | 3/1994 | Gilmore et al. . |
| 5,461,390 | 10/1995 | Hoshen . |
| 5,483,244 | 1/1996 | Grube et al. . |
| 5,491,482 | 2/1996 | Dingwall et al. . |
| 5,502,445 | 3/1996 | Dingwall et al. . |
| 5,512,879 | 4/1996 | Stokes . |
| 5,528,232 | 6/1996 | Verma et al. . |
| 5,596,313 | 1/1997 | Berglund et al. . |
| 5,686,902 | 11/1997 | Reis et al. . |
| 5,769,032 | 6/1998 | Yarnall, Sr. et al. . |
| 5,798,693 | 8/1998 | Engellenner ............................. 340/505 |
| 5,920,261 | 7/1999 | Hughes et al. ........................... 340/572 |

OTHER PUBLICATIONS

Werb, Jay, and Colin Lanzl. "The Practical Engineer." IEEE Spectrum (Sep. 1998): 71–78.

Primary Examiner—Nina Tong
Attorney, Agent, or Firm—William J. Burke

[57] ABSTRACT

A locating system and method employs a plurality of radio frequency readers arrayed with respect to a region having a plurality of zones within which a plurality of radio frequency tags are to be located. Each reader identifies those tags present within its coverage area. The coverage areas of all the readers taken together substantially cover the region and at least part of the coverage area of each reader overlaps at least part of the coverage area of at least one other reader. A data processor receives the identification of the tags within the coverage area of each reader and applies a set of locating rules to determine therefrom in which zone within the region each identified tag is located.

29 Claims, 4 Drawing Sheets

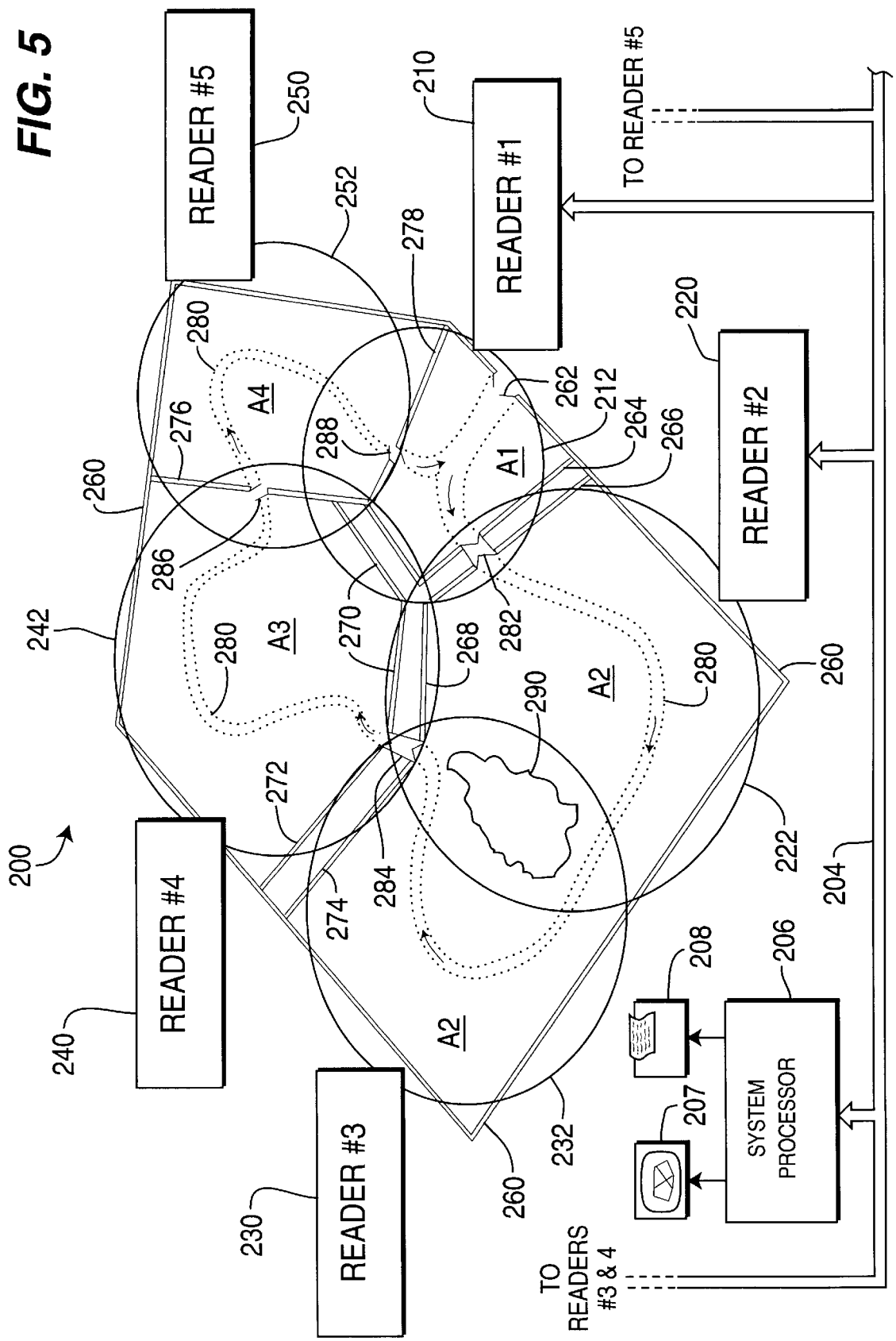

6,040,774

LOCATING SYSTEM AND METHOD EMPLOYING RADIO FREQUENCY TAGS

The present invention relates to a system and method for locating coded articles and in particular for identifying and locating coded articles within a predetermined region.

A variety of techniques have been employed to determine the location of a suitably tagged article within a given region. Most of these approaches, however, employ complex technologies that consider the signal strength, angle-of-arrival, time-of-arrival, or combinations of these parameters to determine the range and bearing of the tagged article relative to a reader/base unit. Such systems are capable of very high accuracy, however, they tend to be relatively complex and expensive, and there are many applications where such accuracy is not required or where such expense is not tolerable. So there is a need for a simpler, less precise location system that will be relatively inexpensive as well.

Existing radio frequency identification systems include a transponder or tag affixed to the article to be identified and an interrogator or reader that communicates with the tags present within the operating region of the reader. This existing system is capable of identifying each of the tags that may be simultaneously present and within range of the reader. However, existing systems cannot determine where within the operating region of the reader a particular tagged article is located. Accordingly, there is a need for a simple and inexpensive way to identify and locate tagged articles within a predetermined region.

Accordingly, the present invention comprises at least first and second readers each having a respective coverage area in which a tag can be identified, wherein at least a part of the coverage area of the first reader overlaps at least a part of the coverage area of the second reader. A processor is responsive to the first and second readers to identify a tag located in the overlap of the coverage areas of the first and second readers.

A method of locating coded articles within a predetermined region including coverage areas of ones of a plurality of readers, comprises the steps of: identifying the coded articles present within the respective coverage area of each one of the plurality of readers; combining the coded article identifications from each one of the plurality of readers; applying a set of locating rules to the combined coded article identifications; and identifying each of the coded articles to a location within the predetermined region in accordance with the set of locating rules.

BRIEF DESCRIPTION OF THE DRAWINGS

In the drawing:

FIG. 5 is a schematic diagram of an exemplary embodiment in accordance with the present invention;

DETAILED DESCRIPTION OF THE PREFERRED EMBODIMENTS

Figure 1:
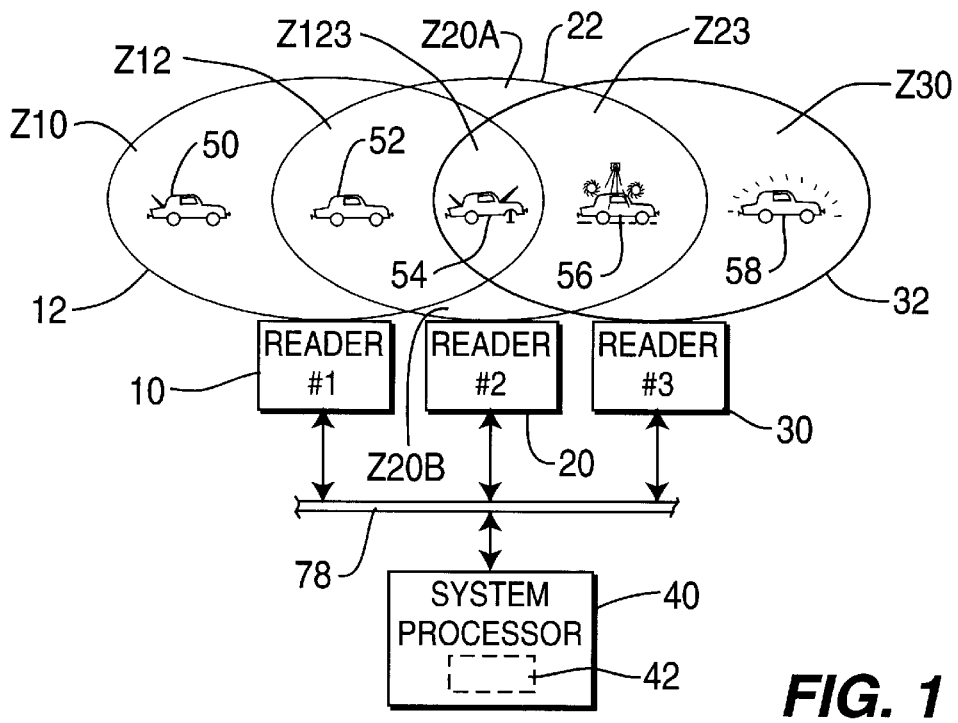
FIG. 1 is a schematic diagram partially in block form of an embodiment of apparatus in accordance with the present invention.

The following description of the preferred embodiments will be more easily understood when read in conjunction with the FIGURES of the drawing referenced therein.

In FIG. 1, reader units 10, 20, 30 are in a linear array or arrangement and have respective coverage areas 12, 22, 32 covering a predetermined region. This region comprises the zones Z10, Z12, Z20A-Z20B, Z123, Z23 and Z30. The coverage area 12 of reader 10 corresponds to the antenna beam pattern of the receiving antenna of reader 10, i.e. transmitted signals that originate within this area 12 will be received and detected by reader 10. Similarly, coverage area 22 corresponds to the antenna beam pattern for reader 20 and coverage area 32 corresponds to the antenna beam pattern of reader 30.

The system of FIG. 1 will be described in the context of a facility utilized for the rental of motor vehicles, such as cars, trucks and the like, it being understood, however, that such application of the present invention is merely exemplary and that there are many different environments in which it may be applied. Each vehicle, for example, to be located includes a coded article or tag which transmits a radio frequency identification signal. If the tag is within the coverage area of a particular reader, then that reader will identify that tag as being present within its coverage area. Accordingly, reader 10 will detect and identify each coded article present within its coverage area 12 which includes zones Z10, Z12 and Z123. Reader 20 will detect and identify each coded article present in its coverage area 22 which includes zones Z12, Z20A, Z20B, Z123 and Z23. Reader 30 will detect and identify each coded article present within its coverage area 32 which includes zones Z123, Z23 and Z30.

In the context of the vehicle rental facility, a vehicle 50 being returned by a rental customer will be left in a receiving area such as zone Z10. Vehicle 52, having been returned and processed is now in an area, such as zone Z12, awaiting service. Vehicle 54, for example, is being serviced and is located in a service bay, such as zone Z123. Yet another vehicle 56, having been serviced, is now in a car wash area, such as zone Z23, being prepared for the next renter. Finally, a shiny clean vehicle 58 is parked in the stall area, such as zone Z30, from which it will be picked up and driven away by a rental customer.

Within the predetermined region, such as the vehicle facility as described, are a plurality of zones. Some zones are unique to one of the plurality of readers 10, 20, 30 and other zones are in regions of overlapping coverage between ones of the readers 10, 20, 30. For example, a coded article present in zone Z10 would be identified only by reader 10 and one present in zone Z30 would be identified only by reader 30. A coded article 52 present in zone Z12 would be identified by both reader 10 and reader 20, and a coded article 56 present in zone Z23 would be identified by both reader 20 and reader 30. Moreover, a coded article 54 present in zone Z123 is present in an area of overlapping coverage of all three readers and so would be identified by reader 10, reader 20 and reader 30.

The locating system according to the present invention includes a plurality of reader units having respective coverage areas at least a part of each coverage area overlapping a part of the coverage area of at least another of the plurality of readers, as is illustrated in FIG. 1 and as just described. For a system employing three readers as shown in FIG. 1, there are a minimum of five locating zones and a maximum of seven locating zones obtained where the coverage areas of each reader overlaps the coverage areas of one or more other readers. Mathematically, in an array of readers of number N, the minimum number of locating zones is given by the expression 2N−1.

Figure 2:
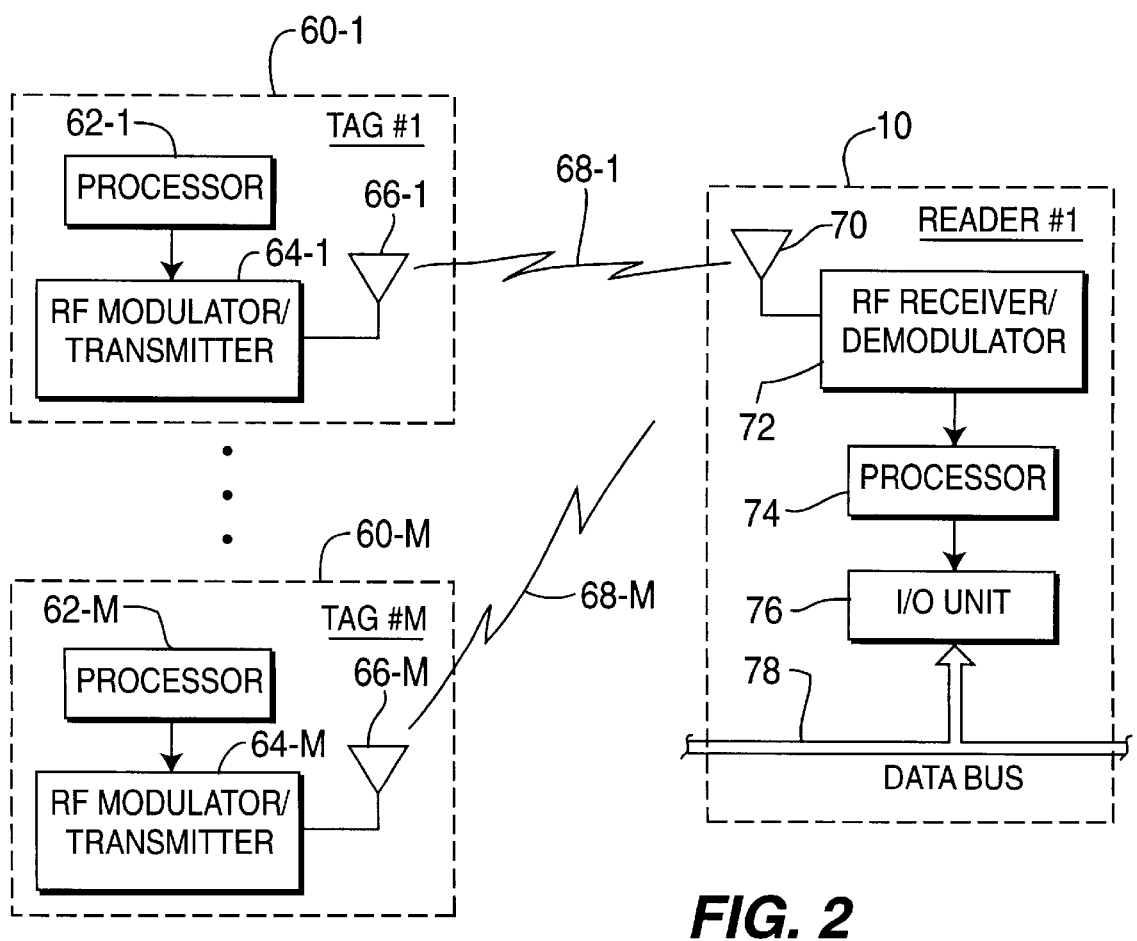
FIG. 2 is a schematic block diagram of an embodiment of coded articles and a reader in accordance with the present invention.

Referring now to FIG. 2, a plurality of coded articles or tags 60-1 through 60-M are shown. Tag #1, identified as 60-1, includes a processor 62-1 in which is programmed unique tag identification information. Processor 62-1 periodically supplies that tag identification information to RF modulator/transmitter 64-1 in which it is modulated and transmitted from the tag via antenna 66-1. If the RF signal 68-1 transmitted from antenna 66-1 of tag 60-1 is of sufficient signal strength to reach reader 10 and be detected thereby, tag 60-1 is said to be within the range of reader 10 or within the coverage area of reader 10. Reader 10 receives radio frequency signals including tag identification information at its antenna 70 which is coupled to its RF receiver/demodulator 72. The tag identification data received thereby is detected and demodulated and is applied to processor 74 of reader 10 wherein it is properly formatted and stored for future use. Tags 60-2, 60-3 (not shown) and so forth operate in like manner.

Similarly, tag 60-M also transmits from its antenna 66-M the tag identification data signal generated by its processor 62-M and modulated and transmitted its RF modulator transmitter 64-M. As shown symbolically in FIG. 2, the RF signal 68-M indicated by a jagged line does not reach as far as the antenna 70 of reader 10 and so tag 60-M would not be detected and identified by reader 10 as being within its coverage area. If, however, tag 60-M were within that coverage area its identification data signal would be received at antenna 70 and processed through RF receiver demodulator 72 and applied to processor 74 of reader 10 wherein it is formatted and stored for future use.

Periodically, reader 10 is interrogated or poled by system processor 40 via data bus 78. When reader 10 is poled as identified by input/output (I/O) unit 76, the tag identification data stored in processor 74 is produced to I/O unit 76 and communicated via data bus 78 to system processor 40. As is shown in FIG. 1, each of readers 10, 20, 30 is coupled to system processor 40 via data bus 78 to communicate indications of the coded articles detected and identified by each reader. The manner in which system processor 40, for example, a desk top computer, processes the tag identification data received from readers 10, 20, 30 will be described in relation to FIGS. 3 and 4.

Figure 3:
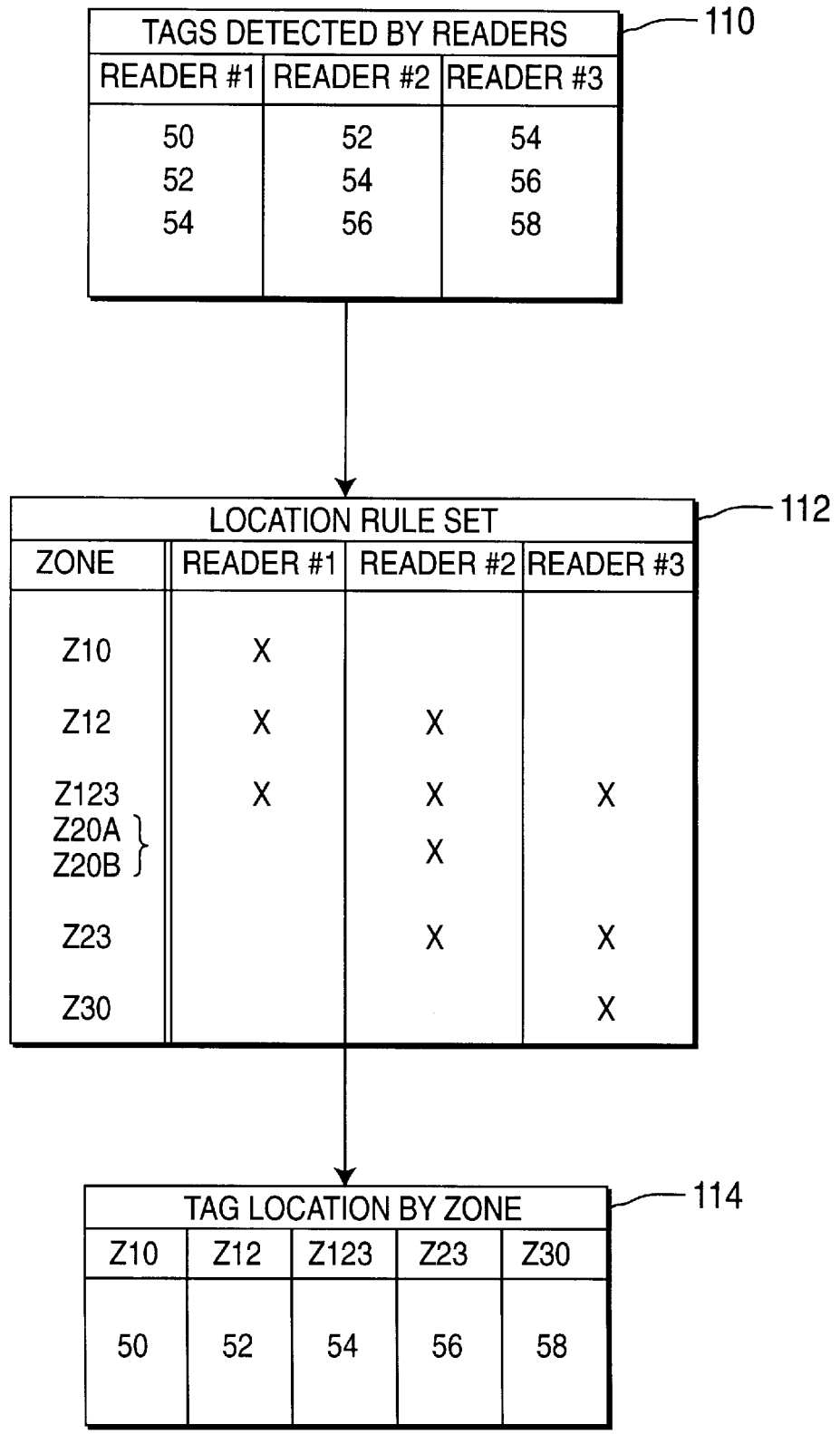
FIG. 3 is a flow diagram of an embodiment of a method in accordance with the present invention.

With reference to FIG. 3, data processor 40 combines the identification data provided by each reader to create in its memory 42 a list 110 of the tags detected by readers 10, 20, 30, known to the processor as readers #1, #2, #3, respectively. It is noted that reader #1, for example, has detected vehicles (coded articles) 50, 52, 54, as being within its coverage area, but cannot determine where within that coverage area any such vehicle might be located. Similarly, reader #2 has detected and identified vehicles 52, 54, and 56, but cannot determine where within its coverage area those vehicles are located. Likewise, reader #3 has detected and identified vehicles 54, 56, and 58, but cannot determine where in its coverage area these vehicles are located. System processor 40 includes a memory 42 in which list 110 including the tag identification data communicated from readers 10, 20, 30 (readers #1, #2, #3) is stored.

The memory 42 of processor 40 also has stored therein a set of location rules 112 which define the correlation between the location zones within the predetermined region (e.g., the various service areas within the vehicle rental facility) in terms of the presence and absence of the identification of a tag by a particular reader or readers as is indicated by the marks "X" of location rule set 112. If a tag is identified by reader #1 and is not identified by reader #2 and #3, then it is located in zone Z10. If a tag is identified as present by readers #1 and #2, but is not identified as present by reader #3, then it is in zone Z12. If a tag is identified as being present by readers #1, #2, and #3, then it is located in zone Z123, and so forth. It is noted that in the particular illustration of the vehicle rental facility used herein, zones Z20A and Z20B, which are within the coverage area of reader 20 only and are therefore a single zone, are not used, however, there is no reason why they could not be used in a different application. The application of location rule set 112 to the identification data of list 110 by system data processor 40 results in the generation of a list 114 of tag locations by zone.

One can see by comparing the location by zone list 114 of FIG. 3 with the tag locations of vehicles 50 through 58 of FIG. 1, that the locating system of the present invention has located each vehicle properly within the zone that it is present in and has done so using a fewer number of readers than there are zones. Indeed a particular advantage of the present invention is that it employs simple readers in a manner to economically obtain a number of location zones that is greater than the number of readers. In fact, as the number of readers is increased, the number of possible location zones increases at a much faster rate.

Figure 4:
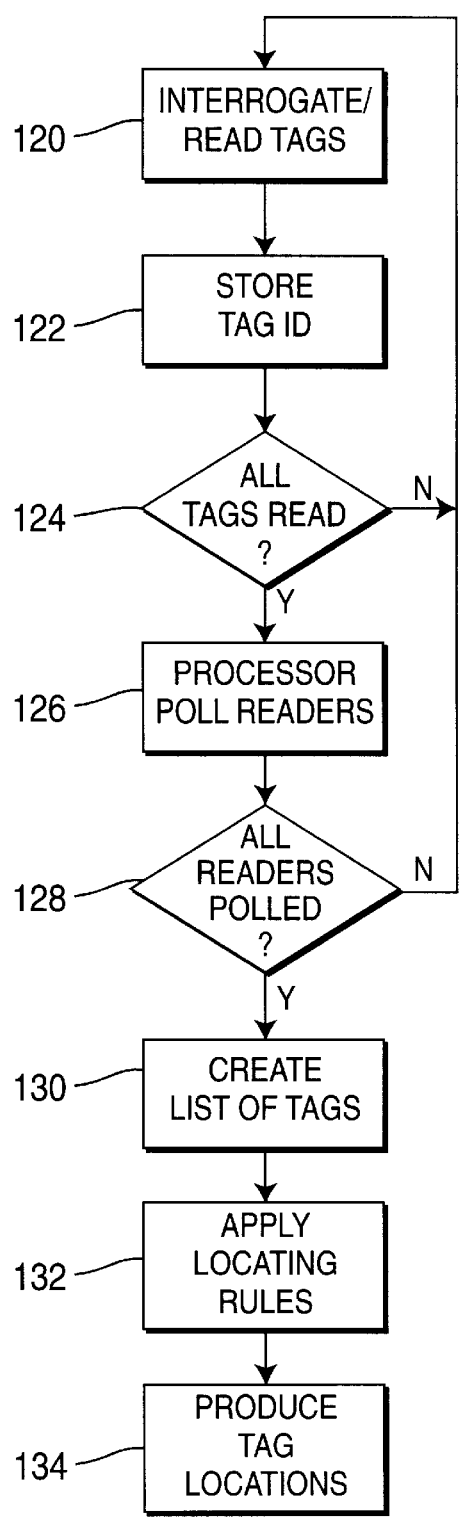
FIG. 4 is a flow diagram of a method in accordance with the present invention including the method shown in FIG. 3.

In the flow diagram of FIG. 4, the step 120 is the reading of the tags by a reader. It is noted that the reader can be a receive-only device that awaits transmissions from the tag during a defined read time interval, for example, a time period of 1 second, where the tags are designed to periodically transmit identification information at intervals of less than the read time interval of the readers, for example, every ½ second. On the other hand, the reader could include a transmitter and receiver which would transmit an interrogation signal into its coverage area which would initiate the response by a tag present therein of its identification information signal. In either case, the reader stores 122 the tag identification information in a list identifying the tags present within its coverage area. If all the tags have not been read 124, the "no" exit path is followed from decision block 124 and additional tags are interrogated and/or read. In the embodiment where the reader is a receive-only reader, the "all tags read?" decision is a timing function of the duration of the read time interval or listening interval of the reader. Where the reader transmits an interrogation signal, it receives back from the tags present within its coverage area a signal indicating their presence therein, and the reader then continues to interrogate tag by tag until it has gone through the entire sequence of possible tags and created the list of all the tags that are present in its coverage area. At the "yes" exit from decision block 124, the system processor will pole the readers 126 to transfer the tag identification data from the lists created in the readers to the list 110 created in the processor. If all the readers have not been poled 128, processor cycles through until all readers have been poled. When all readers have been poled, i.e. the "yes" exit from decision block 128, the processor has created 130 a list 110 of all the tags that have been identified in accordance with the reader that has identified them. Processor then applies 132 the locating rules 112 as previously described in relation to FIG. 3 to produce 134 the tag locations by zone 114 also as described in relation to FIG. 3. Tag locations by zone may be reported, such as by visual display as on a computer monitor or as by a printed record from a printer.

As thus far described, the system according to the present invention is able to identify a plurality of coded articles present within a predetermined region and to locate those articles within a number of zones within the region that exceeds the number of readers. With three readers as in the first embodiment wherein the coverage area of each reader overlaps, at least in part, the coverage area of at least one other reader, between five and seven separate and distinct zones may be obtained. In the embodiment of FIG. 1, the three readers were arranged in a linear array and although six unique zones were available, only five of the zones were utilized in the vehicle rental facility example.

In the embodiment in FIG. 5, a system employing five readers 210, 220, 230, 240, 250 are arranged in a two dimensional array generally about the periphery of a predetermined region 200 as defined, for example, by a fence 260. This predetermined region may be, for example, an entertainment facility 200 such as a wild game or safari park including moveable exhibits, such as animals. The exhibits will move about within the predetermined region through which customers may move either in vehicles or in a tram. In the example to be described in relation to FIG. 5, the tags are associated with the entertainment exhibits, i.e. the animals, within the confines of the region defined by peripheral fence 260, or with workers or vehicles or equipment or objects employed for the operation and/or maintenance of the facility; the tags could also be associated with visitors or customers, their vehicles or with cameras or tape recorders or other objects for their use.

With reference to FIG. 5, it is important to note that the size of the coverage areas of the particular readers may differ as may be obtained by varying the antenna configuration of the readers or by varying the sensitivity of its receiver. For example, reader 210 covers a relatively smaller area such as an entrance area zone A1 in the vicinity of entrance gate 262 through fence 260. In contrast, reader 220 has a coverage area 222 which covers a much larger area within the internal zone that is denominated A2. In the context of this entertainment facility 200, interior fences 264, 266, 268, 270, 272, 274 and 276 define a plurality of internal areas denominated A1, A2, A3 and A4. Internal area A2, for example, is monitored by readers 220 and 230 which could monitor in addition to animals present in zone A2, the vehicle or tram traffic or the like on roadway 280. Internal area A2 might include, for example, a lake or water hole 290 and the zone covered by both the antenna patterns 222 of reader 220 and 232 of reader 230, but not by any other reader, could be used to monitor tagged animals in the vicinity of that water feature.

Similarly, the overlapping areas of coverage areas 212 and 222 of readers 210 and 220, of coverage areas 222 and 242 of readers 220 and 240, and of coverage areas 242 and 232 of readers 240 and 230, can identify tagged articles, such as workers or service trucks, within the areas between the double interior fences 264 through 274. Other areas, perhaps smaller areas, to be monitored include double gate 284 through which roadway 280 passes between internal areas A2 and A3. This zone formed by the overlapping coverage patterns 222, 232, 242 of readers 220, 230, 240 defines the zone of gate 284. Thus, the traffic passing through gate 284 may be monitored in terms of the presence and absence of tags in that zone. Similarly, the area of overlapping coverage of antenna patterns of coverage areas 212, 242 and 252 of readers 210, 240 and 250 might include areas within internal areas A3 and A4 where some particular aspect of caring for the animals located therein is performed. For example, feeding stations might be located within this particular coverage zone so that the presence of animals at the feeding stations and thus their feeding habits may be monitored. Similarly, various overlapping coverage zones would monitor the traffic on roadway 280 in the vicinity of gates 282, 286 and 288, including a portion of roadway 280 where traffic backup awaiting egress through gate 288 might be monitored in the zone within the coverage areas 212 and 252 of readers 210 and 250.

It is noted that while generally elliptical beam pattern or coverage areas are illustrated, other shapes may be obtained by suitably configuring the antenna of each reader as is known to those of skill in the art. While these coverage areas define in general the predetermined region of the entertainment facility 200, it may or may not be acceptable that there are areas of the facility which are outside the coverage areas of readers 210–250 as well as areas outside the periferal fence 260 that are within those coverage areas, however, in the design of the readers and the facility, such needs can easily be taken into account.

The operation of the entertainment facility system 200 is similar to that set forth above in relation to the system of FIG. 1. Each of readers 210 through 250 identifies those coded articles (tags) present within its antenna beam pattern coverage area 212, 222, 232, 242, 252, respectively, and accumulates that identification information. Each of the readers communicates the tag identification information it has accumulated via data bus 204 to system processor 206. The indications of tags identified by each reader and communicated to processor 206 via data bus 204 are then processed to identify those coded articles that are within each of the overlapping zones defined by the respective reader antenna patterns in accordance with the set of locating rules, all as previously described in relation to FIGS. 3 and 4. Processor 204 provides a report of the coded articles (tagged articles) by zone, such as by a visual display on display device 207, for example, a computer monitor, or by a printed report generated by printer 208.

In the embodiment of FIG. 5, five reader units were employed to obtain a system having 15 zones, i.e. a number of zones much larger than the number of reader units, which contributes to the economy of the present invention. It is noted that in a tag location system where part of the coverage area of each reader unit overlaps at least a part of the coverage area of at least one other reader unit, the minimum number of location zones achievable with N reader units is (2N−1). In a system employing five readers (N=5) a minimum of (2N−1)=9 zones and a maximum of 31 zones may be achieved. In general, the maximum number of zones achievable with N reader units is the summation of the combinations of N things taken M things at a time, where M goes from one to N.

In the embodiments thus far described, we have described arrangements or arrays of reader units that are linear (one dimensional) or peripheral about a predetermined region (two dimensional), however, the present invention may be applied in three dimensions, as well as in non-physical dimensions such as time, as is described below.

Figure 6:
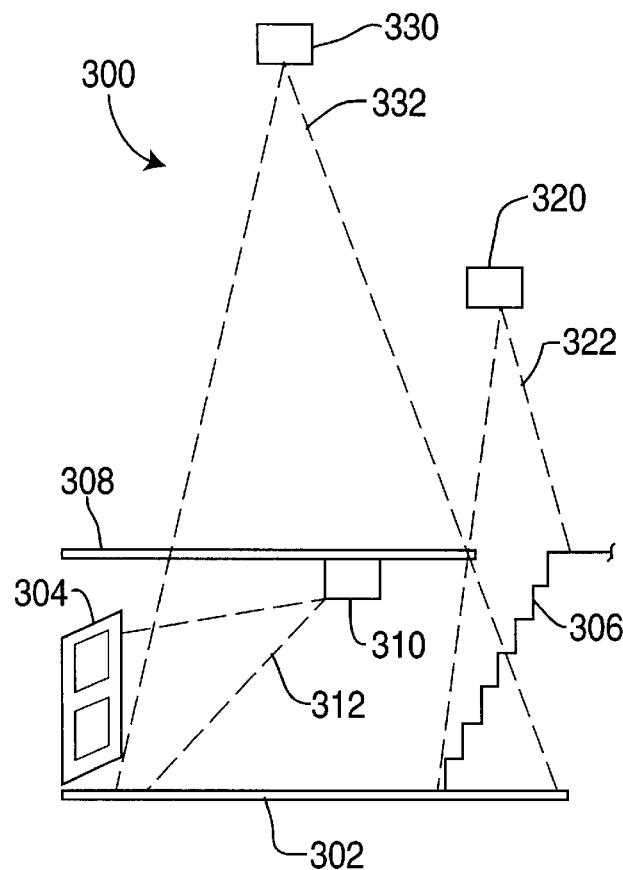
FIG. 6 is a schematic diagram of a further exemplary embodiment in accordance with the present invention.

In FIG. 6, exemplary tag locating system 300 identifies and locates coded articles within a plurality of zones defined in three physical dimensions as in a two-story facility, as well as in time. Access to the first floor 302 of the facility is gained via door 304 with access to second floor 308 being by way of stairway 306 from first floor 302. A reader 310 mounted on a wall or ceiling of first floor 302 has an antenna beam 312 giving it a coverage area including the doorway 304. Reader 320 mounted on a wall or ceiling of second floor 308 has an antenna beam 322 that provides a coverage area including the stairway 306. Reader 330 has an antenna beam 332 which provides a coverage area that includes second floor 308 as well as the first floor 302 because the floor 308 is transparent to the transmission of radio frequency signals, such as between coded articles and reader 330. Note that there is also a zone of spatial overlap of readers 310 and 330 in the zone on first floor 302 proximate to door 304, and a zone of spatial overlap of readers 320 and 330 on the lower portion of stairway 306.

In operation, if a tagged subject (e.g., a tagged person or article) enters through door 304, it is identified by reader 310 as having entered first floor 302 and when it has moved into first floor 302 will be within the coverage area of reader 330 as well. As thus far described, system 300 identifies a tagged subject as being on the first floor when identified by reader 310 or reader 330 or readers 310 and 330, but not having been identified by reader 320, i.e. as not having been on the staircase. When the tagged subject moves to the second floor, it passes from a zone in which it is identified only by reader 330 into the zone of spatial overlap between readers 320 and 330 near the bottom of stairway 306 and it then passes out of that region of spatial overlap into a region within the coverage area of reader 320 only. Thus, the temporal sequence of detection by reader 330, then by readers 330 and 320 at the same time, and then by reader 320 only, provides a locating rule that the subject has ascended stairway 306. Thereafter, if the subject is detected by reader 330, the combination of the temporal and physical aspects of the set of locating rules identifies the subject as being on second floor 308.

Note that there is an ambiguity when a subject is identified at a given time only by reader 330 as that subject may be either on first floor 302 or on second floor 308. However, that ambiguity is resolved by the temporal location rules governing the sequence of passing from the first floor to the second floor via stairway 306 as previously described or by the reverse sequence if the subject moves from second floor 308 to first floor 302. Accordingly, it is seen that the present invention identifies and locates coded articles within a three dimensional physical space and in time by a processor applying a set of locating rules to the coded articles identified by each of a plurality of sensors.

Figure 7:
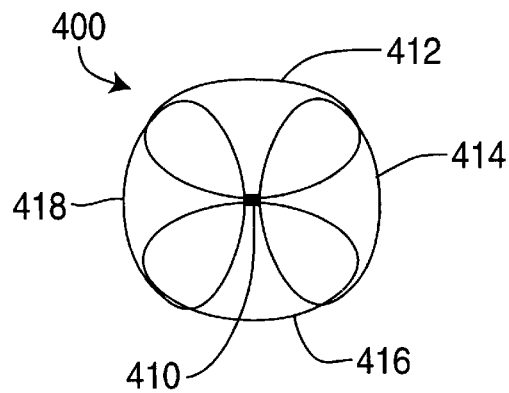
FIG. 7 is an embodiment of an array of reader units in accordance with the present invention.

While the present invention has been described in terms of the forgoing exemplary embodiments, variations within the scope and spirit of the present invention as defined by the claims following will be apparent to those skilled in the art. For example, with reference to FIG. 7, an array 410 of four readers are shown located within the predetermined region defined by the aggregated coverage areas 412, 414, 416 and 418 of the four centrally located readers 410. These readers might be installed on a building or a pole within the area, and it is not necessary that they be located at the geographic center of the coverage area. Indeed, the coverage areas may be quite asymmetrical with respect to the location of the centrally located readers 410. Further, the four readers 410 are of a type that transmit respective interrogating signals to the coded articles within their respective coverage areas 412, 414, 416, 418. These interrogating signals are received by the coded articles within those coverage areas and initiate the coded articles to respond with an identification signal that is received by the respective reader and is added to the list of coded articles identified by that reader. Each such reader will transmit an interrogation signal for each number in the sequence of possible numbers identifying coded articles in order to interrogate for all possible coded articles within range, i.e. within its coverage area. Each reader will record the identifying numbers of those of the coded articles which respond and it identifies as being present within its coverage area. This sequencing may be done in very rapid fashion and may be completed within a matter of a few seconds. In the alternative embodiment of FIG. 7 employing four readers, there are eight zones in which the coded articles may be located. The number of independent zones that may be obtained by the overlapping antenna beam patterns of four reader units is between a minimum of seven and a maximum of fifteen zones.

That which is claimed is:

1. Apparatus for locating a tag comprising:
   at least first and second readers each having a respective coverage area in which a tag can be identified, wherein at least a part of the coverage area of said first reader overlaps at least a part of the coverage area of said second reader; and
   a processor responsive to said first and second readers to identify a tag located in one of (a) the overlap of the coverage areas of said first and second readers and (b) in the coverage area of said first reader but not in the coverage area of said second reader.

2. The apparatus of claim 1 wherein said processor includes a set of locating rules defining locations within a region in terms of presence and absence of identification of a tag within the coverage areas of said first and second readers and the overlap of said coverage areas.

3. The apparatus of claim 2 wherein said set of locating rules defines locations within a region in terms of a time of the presence or absence of identification of a tag within the coverage areas of said first and second readers and the overlap of said coverage areas.

4. The apparatus of claim 1 wherein said first and second readers receive an identification data signal from each tag that is within its respective coverage area.

5. The apparatus of claim 4 wherein each of said first and second readers includes a respective antenna having a beam pattern defining its respective coverage area, and said identification data signal is a radio frequency signal received by said antenna.

6. The apparatus of claim 4 wherein said first and second readers transmit an interrogation signal for initiating said identification data signal.

7. The apparatus of claim 1 in combination with a plurality of tags each communicating an identification signal adapted to be received by said first and second readers.

8. Apparatus for locating coded articles within a predetermined region comprising:
   a number N of reader units each for identifying coded articles present within its respective coverage pattern, wherein said N reader units are arranged to have overlapping coverage patterns defining with said coverage patterns at least 2N−1 coverage zones within said predetermined region, wherein at least one of said 2N−1 coverage zones is within the coverage pattern of only one of said N reader units; and
   a processor including a set of locating rules and coupled to said N reader units for receiving indications of coded articles identified by each said reader unit, said processor locating the identified coded articles to ones of said 2N−1 coverage zones in accordance with said set of locating rules.

9. The apparatus of claim 8 further including a data bus for coupling said indications of coded articles identified by each of said N reader units to said processor.

10. The apparatus of claim 8 wherein each of said N reader units generates said indications of coded articles in response to receiving identification signals transmitted by said coded articles.

11. The apparatus of claim 8 wherein said coverage zones comprise areas of overlapping coverage patterns of said N reader units and areas of said coverage patterns not overlapping another coverage pattern.

12. The apparatus of claim 8 in combination with a plurality of coded articles each transmitting identification signals adapted to be identified by said N reader units.

13. Apparatus for locating coded articles within a predetermined region comprising:

an array of reader units each having a respective coverage area in which a coded article is identified if present, said reader units being arrayed so that their coverage areas taken together substantially cover said predetermined region and so that at least a part of the respective coverage area of each said reader unit is also covered by the respective coverage area of at least one other reader unit, thereby to define a plurality of zones comprising said predetermined region;

a data processor having a memory for storing coded article identification data therein and having a set of locating rules stored therein; and a data communicator coupled between each of said reader units and said data processor for storing in said memory of said data processor coded article identification data produced by said array of reader units in response to each identified coded article present in the respective coverage area of each reader unit, whereby an indicia of the presence and identity of each coded article present is stored in the memory of said data processor;

wherein said data processor processes said coded article identification data in accordance with said set of locating rules to locate each coded article present in said predetermined region within one of said plurality of zones.

14. The apparatus of claim 13 wherein each said reader unit receives an identification data signal from each tag that is present within its respective coverage area.

15. The apparatus of claim 13 wherein each of said reader units includes a respective antenna having a beam pattern defining its respective coverage area.

16. The apparatus of claim 13 wherein said set of locating rules defines said zones in terms of presence and absence of identification of tags within the respective coverage areas of each of said reader units and within areas covered by the respective coverage areas of more than one of said reader units.

17. The apparatus of claim 13 wherein said array of reader units is a linear array.

18. The apparatus of claim 13 wherein said array of reader units is an array about a periphery of said predetermined region.

19. The apparatus of claim 13 wherein said array of reader units includes a plurality of reader units substantially centrally located within said predetermined region.

20. The apparatus of claim 13 in combination with a plurality of coded articles each transmitting an identification signal to ones of said array of reader units.

21. The apparatus of claim 20 wherein said predetermined region includes a facility for vehicles and wherein said coded articles are associated with vehicles.

22. The apparatus of claim 20 wherein said predetermined region includes an entertainment facility and wherein said coded articles are associated with moveable entertainment exhibits.

23. The apparatus of claim 22 wherein said moveable entertainment exhibits include animals.

24. A method of locating coded articles within a predetermined region including respective overlapping coverage areas of ones of a plurality of readers, comprising:

identifying the coded articles present within the respective coverage area of each one of said plurality of readers;

combining the coded article identifications from each one of said plurality of readers;

applying a set of locating rules to the combined coded article identifications; and identifying each of the coded articles to a location within said predetermined region in accordance with said set of locating rules.

25. The method of claim 24 wherein applying a set of locating rules includes:

determining the combination of respective coverage areas in which each coded article is located; and comparing the determined combinations of respective coverage areas to a predetermined correspondence of combinations of coverage areas to locations.

26. The method of claim 24 wherein identifying the coded articles present includes:

transmitting from said coded articles an identification signal; and receiving said identification signal at ones of said plurality of readers.

27. The method of claim 24 wherein combining the coded article identifications includes polling each one of said plurality of readers to obtain indicia of identified coded articles therefrom.

28. A system for locating rental vehicles within zones in a rental vehicle facility comprising:

a plurality of coded tags, each tag being affixed to a rental vehicle;

an array of reader units arrayed about said rental vehicle facility for identifying coded tags within respective coverage areas of ones of said reader units; and a data processor coupled to said reader units for receiving indicia of the coded tags identified by said reader units and for applying a set of locating rules to locate said rental vehicles within a number of zones in said rental vehicle facility, wherein the number of said zones exceeds the number of said reader units.

29. A system for locating moveable objects within zones in an entertainment facility comprising:

a plurality of coded tags, each tag being affixed to a moveable object;

an array of reader units arrayed about said entertainment facility for identifying coded tags within respective coverage areas of ones of said reader units; and a data processor coupled to said reader units for receiving indicia of the coded tags identified by said reader units and for applying a set of locating rules to locate said moveable objects within a number of zones in said entertainment facility, wherein the number of said zones exceeds the number of said reader units.

* * * * *